Figure 1:
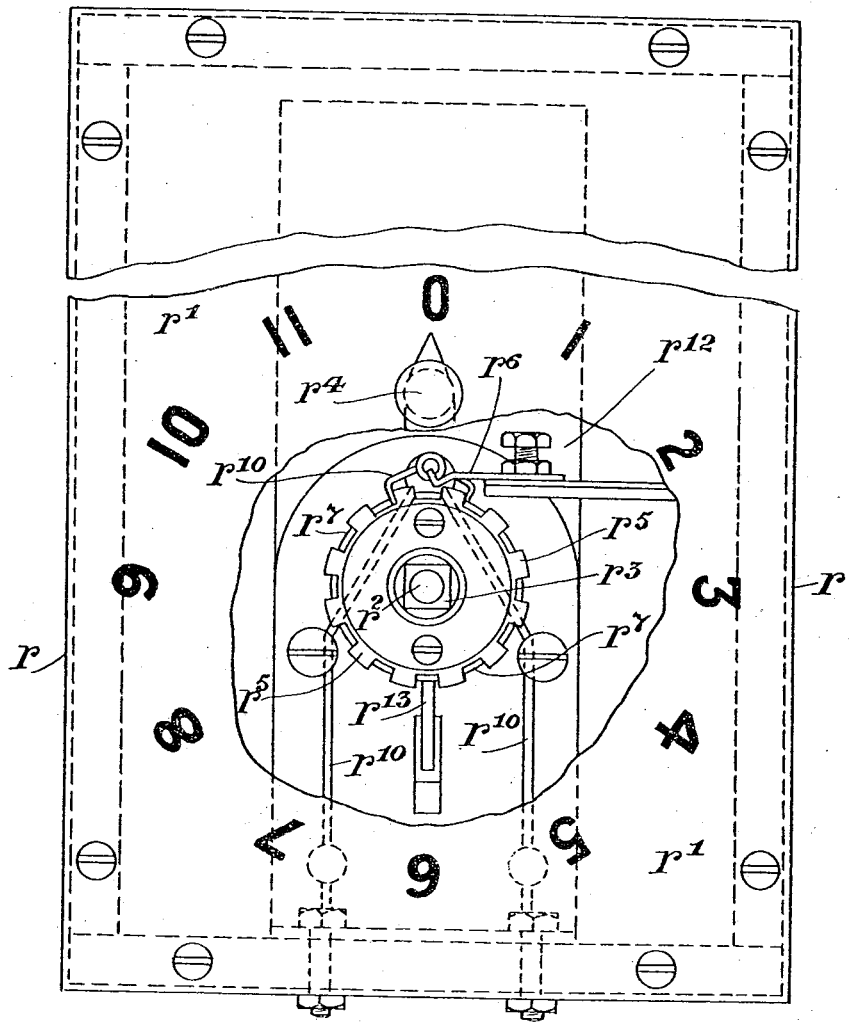

G. H. BROWN, DEC'D.
H. BROWN, EXECUTOR.
TRANSMITTING APPARATUS FOR USE IN ELECTRIC SIGNALING ON RAILWAYS.
APPLICATION FILED DEC. 6, 1910.

1,111,733.

Patented Sept. 29, 1914.
3 SHEETS—SHEET 1.

G. H. BROWN, DEC'D.
H. BROWN, EXECUTOR
TRANSMITTING APPARATUS FOR USE IN ELECTRIC SIGNALING ON RAILWAYS.
APPLICATION FILED DEC. 6, 1910.

1,111,733.

Patented Sept. 29, 1914.

3 SHEETS—SHEET 2.

Witnesses:
O. F. Nagle
L. Douville

Inventor
George Herbert Brown, Deceased
by Herbert Brown, Executor
By Wiederoheim & Fairbanks
Attorneys.

G. H. BROWN, DEC'D.
H. BROWN, EXECUTOR.
TRANSMITTING APPARATUS FOR USE IN ELECTRIC SIGNALING ON RAILWAYS.
APPLICATION FILED DEC. 6, 1910.

1,111,733.

Patented Sept. 29, 1914.

3 SHEETS—SHEET 3.

Witnesses:
O. F. Nagle
L. Douville

Inventor
George Herbert Brown, deceased
by Herbert Brown, Executor
Wiedersheim & Fairbanks
By Attorneys.

UNITED STATES PATENT OFFICE.

GEORGE HERBERT BROWN, DECEASED, BY HERBERT BROWN, EXECUTOR, OF BELFAST, IRELAND.

TRANSMITTING APPARATUS FOR USE IN ELECTRIC SIGNALING ON RAILWAYS.

1,111,733.  Specification of Letters Patent.  Patented Sept. 29, 1914.

Original application filed August 31, 1909, Serial No. 515,551. Divided and this application filed December 6, 1910. Serial No. 595,937.

*To all whom it may concern:*

Be it known that I, HERBERT BROWN, a subject of the King of Great Britain, residing at Belfast, Ireland, am the executor of the late GEORGE HERBERT BROWN, who invented certain new and useful Improvements in Transmitting Apparatus for Use in Electric Signaling on Railways, of which the following is a specification.

This invention, which is a sub-division of my co-pending application Serial No. 515,551, filed 31st August, 1909, relates to electrically controlled transmitting apparatus for use in electrical signaling on railways.

The apparatus is specially adapted for use in connection with such electrical signaling systems on railways, for intercommunication between the signalmen and the train officials, as require a transmitting apparatus in each signal cabin and a corresponding indicator apparatus on each locomotive the apparatuses being controlled by the action of solenoids. With such systems it is usual to have ramp rails laid on the track one of the ramp rails being charged with electricity from a dynamo on the locomotive of the train whenever a trolley on the engine, in circuit with said dynamo, comes into contact with said ramp rail, electricity then passing from this ramp rail, by means of a wire, to a solenoid in the signal cabin and energizing the same, said solenoid being in connection with the transmitting apparatus of the cabin. Another ramp rail is in electrical connection with the transmitting apparatus in the signal cabin and also in connection by a trolley and wiring with the solenoid on the locomotive this solenoid being energized by electric energy passing from the dynamo on the engine to the first ramp rail thence to the solenoid and transmitting apparatus of the signal cabin and back therefrom to the second ramp rail and the solenoid and indicator apparatus on the locomotive. By making and breaking the circuit signals are transmitted by the signalman to the engine driver. Such a system is fully described in my said co-pending case 515,551.

The present invention simply concerns the transmitting apparatus which is specially adapted, when working in conjunction with corresponding indicator apparatus for indicating to the engine driver the platform or dock the train is being sent into, or the geographical position of the train or dangerous curves, junctions, distant and home signals or any other special or important features on the line that it is desired to call the engine driver's attention to.

In order that my invention may be properly understood, I have hereunto appended explanatory drawings, whereon:—

Figure 2:
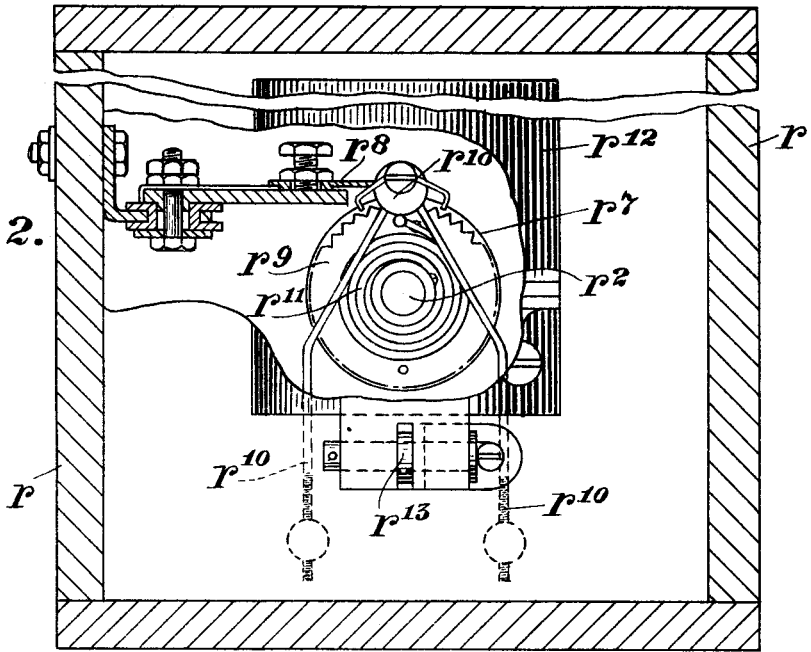
Figure 3:
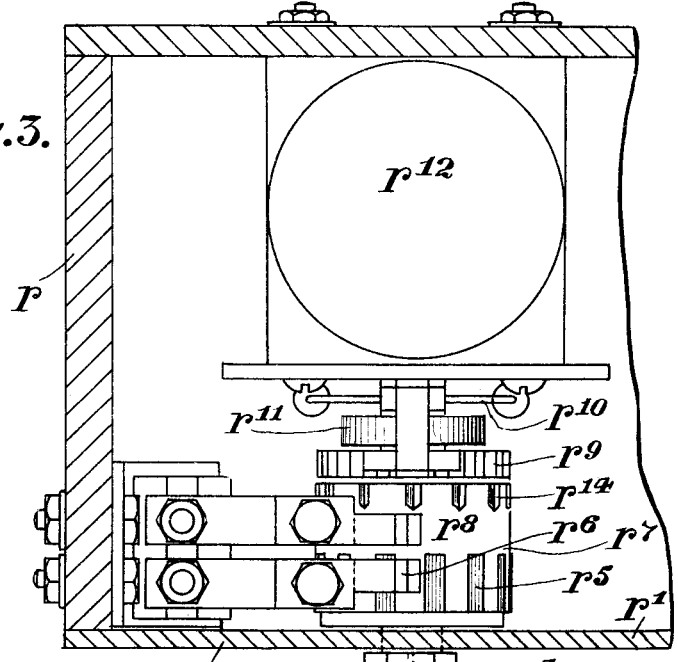
Figure 5:
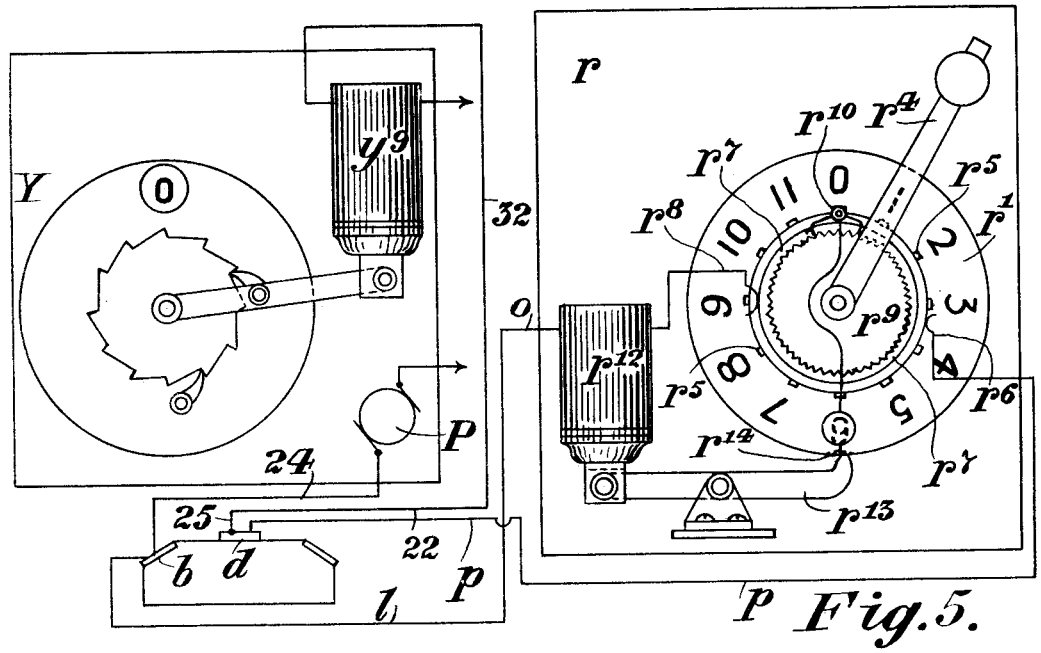
Figure 4:
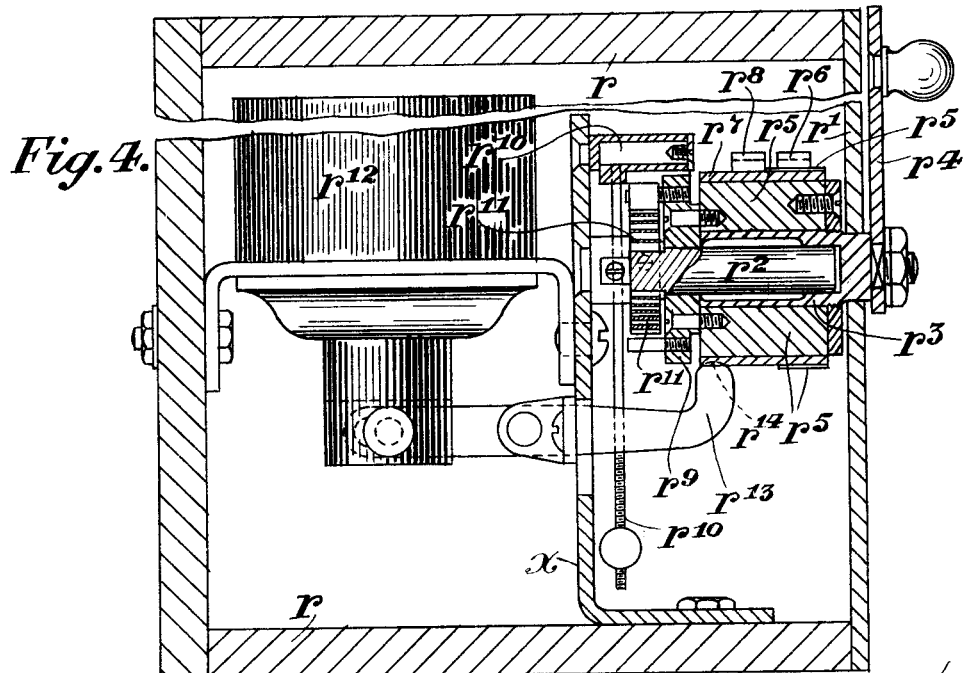

Figure 1 is a front view of the transmitter apparatus used in the signal cabin, the front plate $r^1$ being partly broken away to show the interior mechanism. Fig. 2 is a back view of same with solenoid $r^{12}$ partly broken away. Fig. 3 is a sectional plan, and Fig. 4 a vertical section of the same. Fig. 5 is a diagrammatic view for showing how the apparatus is operated in conjunction with corresponding indicating apparatus Y on an engine.

The transmitter apparatus consists of a rectangular box or casing $r$ having a dial plate $r^1$ marked with numbers on its face to correspond with the numbers of the platforms in the station or terminus, or with code numbers for conveying information to the engine driver. Fixed in an upright $x$ of the box or casing $r$ is a pin $r^2$ having revolubly mounted thereon a sleeve $r^3$ which passes through the dial plate $r^1$ and has secured to it an indicator handle $r^4$. The revoluble sleeve $r^3$ is provided with an inner ring $r^5$ of insulating material and an outer collecting ring $r^7$ which latter is provided with radial openings through which radial parts of the ring $r^5$ project and form a plurality of insulated points raised above the surface of the conductor ring $r^7$. A brush $r^6$ is suitably mounted and positioned adjacent the ring structure and arranged in alinement with the insulated projections of the ring $r^5$ and it is also normally arranged so as to form a contact with the surface of the conductor ring $r^7$ when the said brush is not in engagement with one of the insulated radial members.

$r^8$ designates a brush suitably mounted to have a continuous bearing upon the periphery of the ring $r^7$, as shown in Fig. 3. The number of spaces between the radial projections of the ring $r^5$ correspond in number to the numbering on the faces of the dial for a purpose presently to be described.

A toothed wheel $r^9$ having an escapement $r^{10}$ secured thereto is carried by the upright $x$ which wheel is secured to the ring $r^5$ while connected to said toothed wheel is one end of a clock spring $r^{11}$ the other end of which is fastened to the pin $r^2$. A solenoid $r^{12}$ is fitted in the box or casing $r$ and in the circuit with the brush $r^8$. A catch $r^{13}$ is pivotally mounted adjacent the ring $r^7$ and adapted under normal deënergized condition of the solenoid to engage the recesses $r^{14}$ of the ring $r^7$, it being noted that the armature end of the said catch is weighted so as to carry out the aforesaid function. Upon the energizing of the solenoid $r^{12}$ the catch $r^{13}$ will of course be withdrawn from engagement with the recesses $r^{14}$ and the ring $r^7$ thereupon be released for rotary return movement.

As shown in Fig. 5, the solenoid $r^{12}$ is connected by the wire $o$ to a ramp rail $b$ so that the said solenoid is energized whenever a trolley on the engine of the train contacts with said ramp rail, since the said trolley is in the circuit embodying the wire 24 and dynamo P on the engine. The ground from the said dynamo is connected as is customary to the engine frame. The brush $r^8$ is, as stated, in circuit with the solenoid $r^{12}$ while the brush $r^6$ forms part of the same circuit being connected with the second ramp rail $d$, which latter is in the path of movement of a second trolley 25, which is on the engine and completes the circuit by wires 22 and 32 through the solenoid $y^9$ of the indicator apparatus Y on the locomotive to the ground of the engine frame.

I will now with the aid of the drawings describe the working of the apparatus in conjunction with the indicator apparatus.

The signalman first turns the handle $r^4$ of his cabin apparatus (see Fig. 5) against the pull of the clock spring $r^{11}$ (see Fig. 2) over the number of the dial representing the platform into which the train is to run. The catch $r^{13}$ thereupon engages a notch $r^{14}$ and maintains the handle $r^4$ in such set position until the train reaches the location of the ramp rails $b$ and $d$ and brings the trolleys into contact with said ramp rails. As soon as this takes place the circuit is closed and the current passes from the dynamo P on the engine by wire 24, the trolley connected thereto, the ramp rail $b$ by the wire $b$ to the solenoid $r^{12}$ through the solenoid to the brush $r^8$ around the conductor ring $r^7$ to brush $r^6$ by wire $p$ to ramp rail $d$, trolley 25, wires 22 and 32, solenoid wires 9 to the ground and thence returns to the dynamo P. The closing of this circuit energizes the solenoid $r^{12}$ so that the catch 13 is shifted out of engagement with the recess $r^{14}$, so that the sleeve $r^3$ and the parts carried thereby are free to move. The spring $r^{11}$ now comes into action and causes the handle $r^4$ to swing back to its original position carrying with it the rings $r^5$ and $r^7$ and of course moving the toothed wheel $r^9$ which under the action of the escapement $r^{10}$ checks the speed of the return of the parts. During this movement the brush $r^6$ is intermittently raised from its contact position with the ring $r^7$, owing to the insulated projections of ring $r^5$, so that each time the said brush is raised from the ring $r^7$ the circuit is broken and as the number of the insulated projections correspond to the number of the required platform, the apparatus in the cab of the engine will correctly indicate the number of the particular platform at which the handle $r^4$ has been set.

Having now fully described my invention what I claim and desire to secure by Letters Patent is:—

1. Transmitting apparatus for use in conjunction with an indicator in electrical signaling on railways, comprising a dial having indications thereon, a pointing device which can be worked over said dial, a conducting ring operatively connected with said pointing device and having a series of openings therethrough, an insulating ring arranged within said conducting ring and having a series of projections projecting through said series of openings, means for retaining the rings in position after they have been moved by the pointing device, electrical means for releasing said rings, means for automatically returning the rings after release, a brush bearing on the outer ring and which is in circuit with the said electrical means, and a second brush which is in circuit with the indicator and bears on the outer ring and which is also adapted to be moved out of contact with said outer ring by the projections of the inner ring.

2. Transmitting apparatus for use in conjunction with an indicator in electrical signaling on railways, comprising a dial having indications thereon, a pointing device which can be worked over said dial, means for carrying the pointing device, a conducting ring operatively connected with said pointing device and having a series of openings therethrough, an insulating ring arranged within said conducting ring and having a series of projections projecting into said series of openings, means for temporarily retaining the rings in position after they have been moved by the pointing device, electrical means for releasing said rings, means for automatically returning the rings after they have been released, escapement mechanism for controlling the action of said ring returning means, a brush bearing on the outer ring and which is in circuit with the said electric means, a second brush which is in circuit with the indicator and which also bears on the outer ring and is adapted to be moved out of contact with the outer ring by the projections on the inner ring.

3. A transmitting apparatus for use in conjunction with an indicator in electrical signaling on railways, comprising a dial having indications thereon, a pointing device which can be worked over said dial, means for carrying the pointing device, a conducting ring operatively connected with said pointing device and having a series of openings therethrough and a number of recesses therein, an insulating ring arranged within said conducting ring and having a series of projections projecting into said series of openings, a catch adapted to engage a recess in said conducting ring, a solenoid adapted to remove said catch from said recess, means for automatically returning the rings after said catch has been moved out of engagement therewith, a brush bearing on the conducting ring and which is in circuit with said solenoid, a second brush which is in circuit with the indicator and which also bears on the collecting ring and is adapted to be moved intermittently out of contact with the conducting ring by the projections on the insulating ring.

In testimony whereof I affix my signature in presence of two witnesses.

HERBERT BROWN,
*Executor of the estate of George Herbert Brown, deceased.*

Witnesses:
ANDREW HAMILTON,
HARRY WALTER ALLSOPP.

---

Copies of this patent may be obtained for five cents each, by addressing the "Commissioner of Patents, Washington, D. C."